(12) United States Patent
Fowler et al.

(10) Patent No.: US 11,441,691 B2
(45) Date of Patent: Sep. 13, 2022

(54) CHECK VALVE FOR USE IN ANIMAL DRINKER SYSTEMS

(71) Applicant: Valco Industries, Inc., New Holland, PA (US)

(72) Inventors: Amos Glen Fowler, Terre Hill, PA (US); Daniel B. Truong, Lancaster, PA (US)

(73) Assignee: VALCO INDUSTRIES, INC., New Holland, PA (US)

( * ) Notice: Subject to any disclaimer, the term of this patent is extended or adjusted under 35 U.S.C. 154(b) by 0 days.

(21) Appl. No.: 17/443,576

(22) Filed: Jul. 27, 2021

(65) Prior Publication Data

US 2022/0034415 A1 Feb. 3, 2022

Related U.S. Application Data

(60) Provisional application No. 63/059,420, filed on Jul. 31, 2020.

(51) Int. Cl.
| | |
|---|---|
| *F16K 15/04* | (2006.01) |
| *A01K 39/02* | (2006.01) |
| *A01K 7/02* | (2006.01) |
| *F16K 31/18* | (2006.01) |
| *F16K 31/24* | (2006.01) |
| *F16K 17/28* | (2006.01) |

(52) U.S. Cl.
CPC .............. *F16K 15/042* (2013.01); *A01K 7/02* (2013.01); *A01K 39/02* (2013.01); *F16K 17/285* (2013.01); *F16K 31/18* (2013.01); *F16K 31/24* (2013.01); *Y10T 137/3099* (2015.04); *Y10T 137/7838* (2015.04); *Y10T 137/791* (2015.04)

(58) Field of Classification Search
CPC ........... Y10T 137/791; Y10T 137/3099; Y10T 137/7838; F16K 15/042; F16K 15/1823; F16K 31/18; F16K 31/24; F16K 17/285; A01K 7/02; A01K 7/04; A01K 7/06; A01K 39/0213; A01K 39/02
See application file for complete search history.

(56) References Cited

U.S. PATENT DOCUMENTS

| | | | | |
|---|---|---|---|---|
| 1,918,566 | A | * | 7/1933 | Sadleir ............... A01K 39/0213 251/339 |
| 2,919,707 | A | * | 1/1960 | Seidler .................. F16K 24/042 137/39 |

(Continued)

*Primary Examiner* — Mary E McManmon
*Assistant Examiner* — Frederick D Soski
(74) *Attorney, Agent, or Firm* — Duane Morris LLP

(57) ABSTRACT

A valve includes a housing, a first ball, a second ball, and a deflector plate. The housing defines an inner chamber and has an inlet and an outlet providing fluid communication into the inner chamber. A longitudinal axis extends between the inlet and outlet. The first ball is disposed in the inner chamber between the inlet and outlet and rests on a seat extending into the inner chamber. The second ball is disposed in the inner chamber between the first ball and outlet and rests on the first ball. The deflector plate is disposed in the inner chamber and positioned between the inlet and first ball. The first ball, second ball, and deflector plate are aligned so that their centers lie on the longitudinal axis. The deflector plate is configured to deflect gas entering through the inlet to prevent the gas from driving the first and second balls upward.

20 Claims, 12 Drawing Sheets

(56) References Cited

U.S. PATENT DOCUMENTS

| | | | | |
|---|---|---|---|---|
| 3,031,097 A * | 4/1962 | Whittam | ................ | B65D 49/06 215/22 |
| 3,424,431 A * | 1/1969 | Grose | .................... | F16K 31/18 137/449 |
| 3,674,061 A * | 7/1972 | Calisher | .................. | F16L 37/34 248/908 |
| 3,693,650 A * | 9/1972 | MacGuire | ............ | F02M 23/095 123/585 |
| 3,746,038 A * | 7/1973 | Simmons | ................ | F02C 7/228 137/513.5 |
| 3,799,132 A * | 3/1974 | MacGuire | ............ | F02M 23/095 138/40 |
| 4,024,846 A * | 5/1977 | MacGuire | ............ | F02M 25/06 123/585 |
| 4,325,398 A * | 4/1982 | Green | .................. | F16K 17/366 137/39 |
| 4,487,215 A * | 12/1984 | Green | .................. | F16K 17/366 137/39 |
| 4,499,615 A * | 2/1985 | Radovsky | ................ | E03D 1/36 4/398 |
| 4,524,794 A * | 6/1985 | Haines | .................. | F16K 24/046 137/423 |
| 4,829,933 A * | 5/1989 | Van der Veer | ......... | A01K 39/02 119/80 |
| 5,042,519 A * | 8/1991 | Kerlin | ............. | B60K 15/03519 137/202 |
| 5,823,259 A * | 10/1998 | Royle | ...................... | E03B 3/16 166/97.1 |
| 6,016,828 A * | 1/2000 | Machledt | ............. | F16K 24/046 137/433 |
| 2002/0079000 A1* | 6/2002 | Inage | .................... | F16K 15/042 137/539 |
| 2006/0000511 A1* | 1/2006 | Shade | .................... | F16K 15/04 137/533.11 |
| 2014/0000524 A1* | 1/2014 | Orgill | ................... | A01K 39/024 137/589 |
| 2017/0215389 A1* | 8/2017 | Orgill | ................ | A01K 39/0213 |
| 2019/0032322 A1* | 1/2019 | Griebel | .................. | F16K 31/20 |

* cited by examiner

CHECK VALVE FOR USE IN ANIMAL DRINKER SYSTEMS

CROSS-REFERENCE TO RELATED APPLICATIONS

This application claims priority under 35 U.S.C. § 119(e) to U.S. Provisional Application No. 63/059,420, filed Jul. 31, 2020, the entire contents of which are incorporated herein by reference.

FIELD

The present disclosure is related to a system for supplying water to animals and particularly related to an improved check valve device for dispensing water to animals such as poultry.

BACKGROUND

Systems for supplying water to animals such as poultry typically include a number of horizontal supply lines suspended from a ceiling. Each supply line can include a number of watering units, such as trigger-operated watering units, that allow animals to cause water in the supply lines to be dispensed from the watering unit for consumption by the animals. In addition, such watering systems typically include a number of standpipe assemblies in fluid communication with each supply line to allow gasses within the supply lines to escape. A check valve is typically provided at the top of each of the standpipes in the water supply system to allow venting of gasses trapped in the water supply system while also preventing any water that may rise through the standpipe from escaping—for example, during flushing operations of the watering system.

Such check valves can include a floating ball that seals the outlet of the valve when water enters the valve in order to prevent the water from escaping. However, such valves are susceptible to becoming stuck in a closed configuration when a high velocity and/or high pressure stream of gas suddenly enters the valve, which prevents the gas from venting as intended.

SUMMARY

In one aspect, a valve is disclosed that includes a housing, a first ball, a second ball, and a deflector plate. The housing defines an inner chamber and has an inlet at a first end of the housing and an outlet at a second end of the housing, the inlet and the outlet providing fluid communication into the inner chamber. A longitudinal axis of the housing extends between the inlet and the outlet. The first ball is disposed in the inner chamber between the inlet and the outlet and, when the valve is in a vertical orientation with the inlet being at the bottom and the outlet being at the top, the first ball rests on a seat extending into the inner chamber from the housing. The second ball is disposed in the inner chamber between the first ball and the outlet and rests on the first ball when the valve is in the vertical orientation. The deflector plate is disposed in the inner chamber positioned between the inlet and the first ball and is coupled to the housing. The first ball, the second ball, and the deflector plate are linearly aligned so that their geometric centers lie on the longitudinal axis. The first ball and the second ball are movable from a first position, in which the first ball is resting on the seat and the outlet is open, to a second position, in which the first ball is raised above the seat toward the outlet urging the second ball to engage the outlet and seal the outlet. The deflector plate deflects gas that enters through the inlet to prevent the gas from driving the first and second balls upward toward the second position.

In another aspect, a standpipe assembly is disclosed that includes a tube and a valve attachable at an end of the tube. The valve includes a housing, a first ball, a second ball, and a deflector plate. The housing defines an inner chamber and has an inlet at a first end of the housing and an outlet at a second end of the housing, the inlet and the outlet providing fluid communication into the inner chamber. A longitudinal axis of the housing extends between the inlet and the outlet. The first ball is disposed in the inner chamber between the inlet and the outlet and, when the valve is in a vertical orientation with the inlet being at the bottom and the outlet at the top, the first ball rests on a seat extending into the inner chamber from the housing. The second ball is disposed in the inner chamber between the first ball and the outlet and rests on the first ball when the valve is in the vertical orientation. The deflector plate is disposed in the inner chamber positioned between the inlet and the first ball and is coupled to the housing. The first ball, the second ball, and the deflector plate are linearly aligned so that their geometric centers lie on the longitudinal axis. The first ball and the second ball are movable from a first position, in which the first ball is resting on the seat and the outlet is open, to a second position, in which the first ball is raised above the seat toward the outlet urging the second ball to engage the outlet and seal the outlet. The deflector plate deflects gas that enters through the inlet to prevent the gas from driving the first and second balls upward toward the second position.

BRIEF DESCRIPTION OF THE DRAWINGS

The features of the embodiments described herein will be more fully disclosed in the following detailed description, which is to be considered together with the accompanying drawings wherein like numbers refer to like parts.

DETAILED DESCRIPTION

Figure 1:
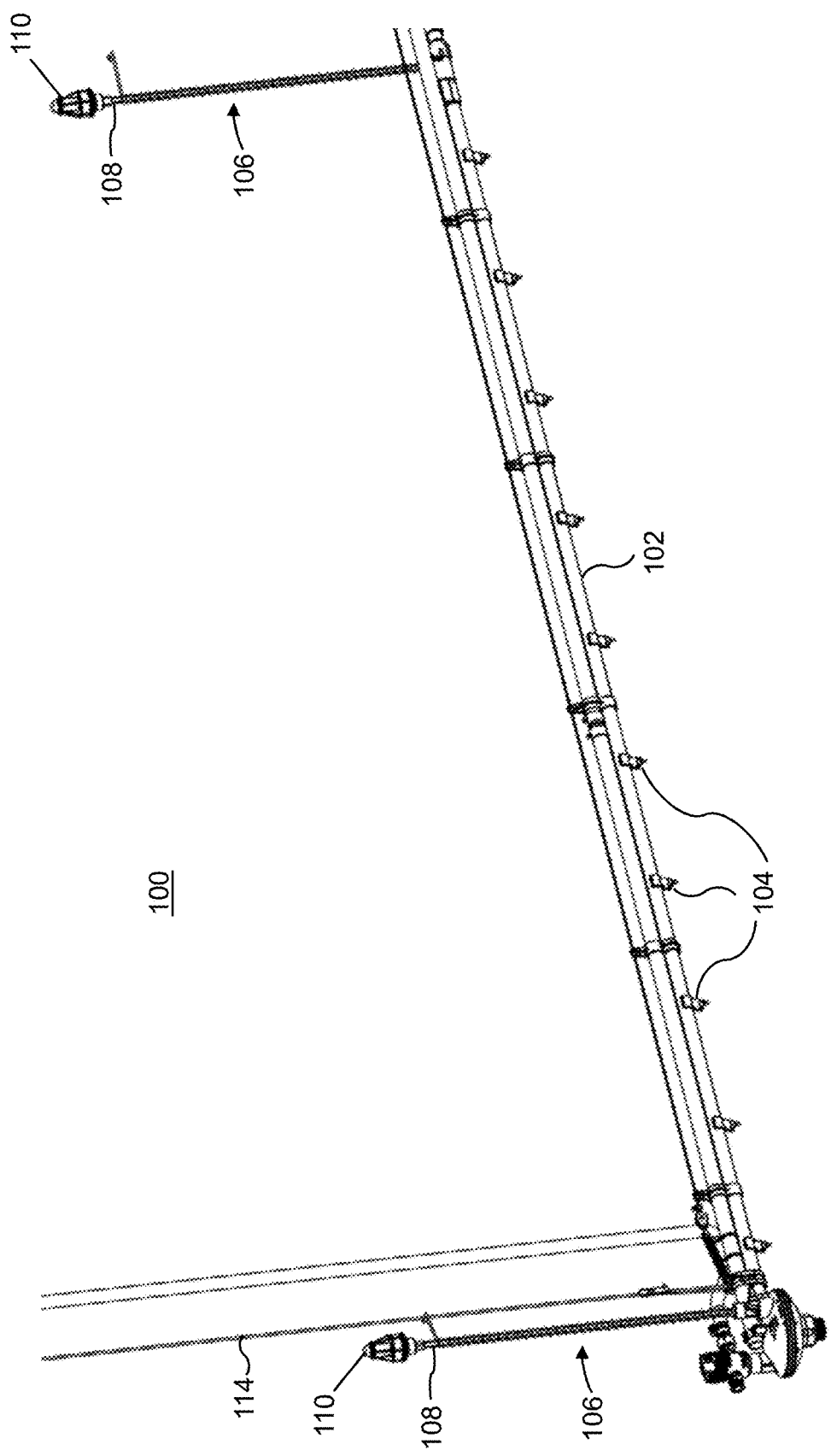
FIG. 1 shows a perspective view of a watering system including valves according to embodiments described herein.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The valves described herein are configured for use in a drinker or watering system used for providing water to poultry and other livestock. Such valves allow air to escape from the drinker system while preventing the escape of water and/or other liquids during flushing operations. The valves of the present disclosure include features to prevent locking of the valve that can occur in prior art valves in response to a rapid inflow of gas into the valve.

FIG. 1 shows a perspective view of a portion of an exemplary watering system 100. The watering system includes supply lines 102 suspended from a ceiling or other structure. The watering system 100 further includes a plurality of watering units 104 coupled to each supply line 102 to allow an animal to access the water in the supply line 102. The watering system 100 further includes a plurality of standpipe assemblies 106 connected to the supply line 102 such that gas and liquid in the supply line 102 can flow into the standpipe assemblies 106.

Figure 2:
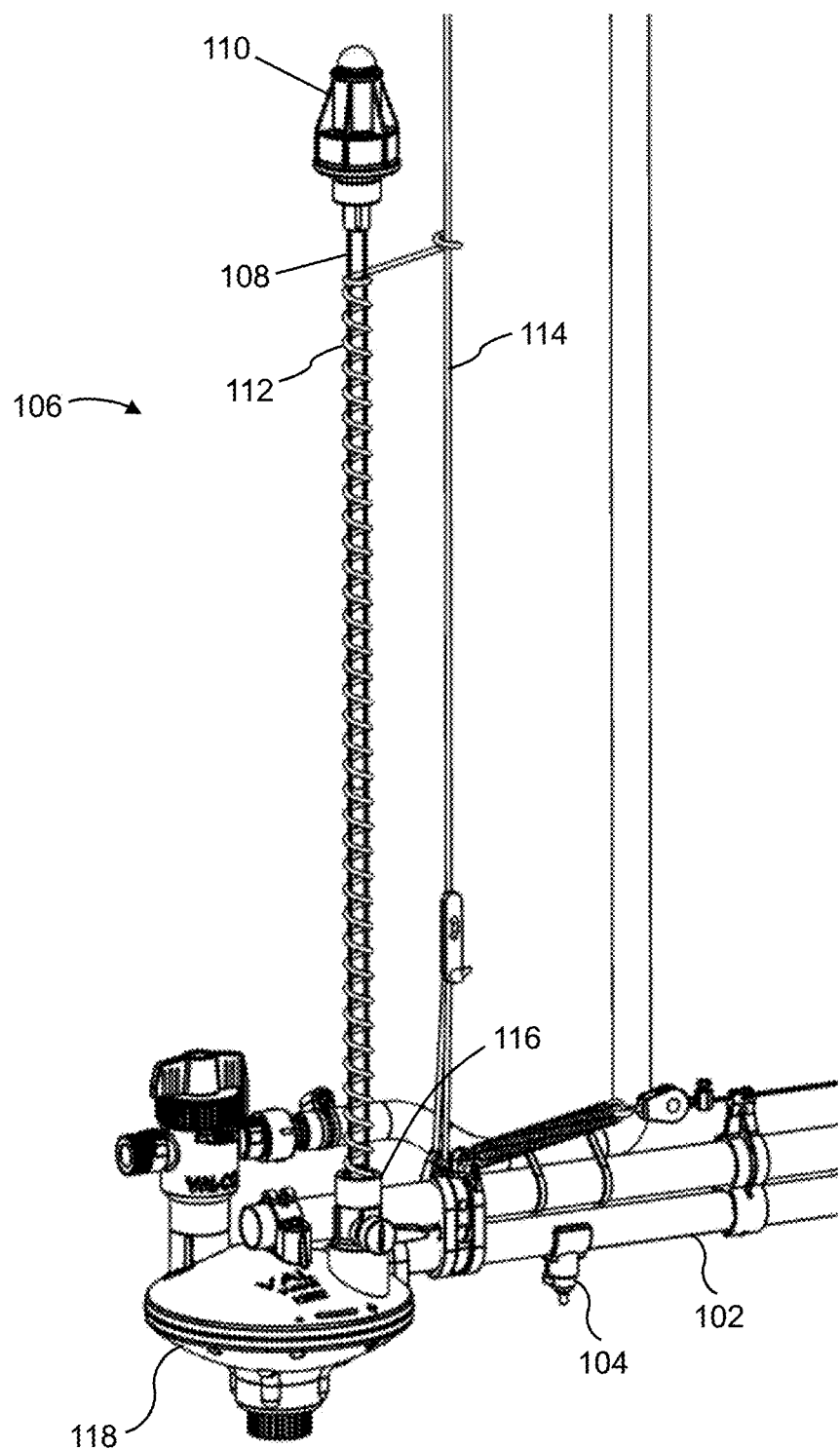
FIG. 2 shows a standpipe assembly including a valve according to an embodiment described herein connected to a regulator of a watering system.
Figure 3:
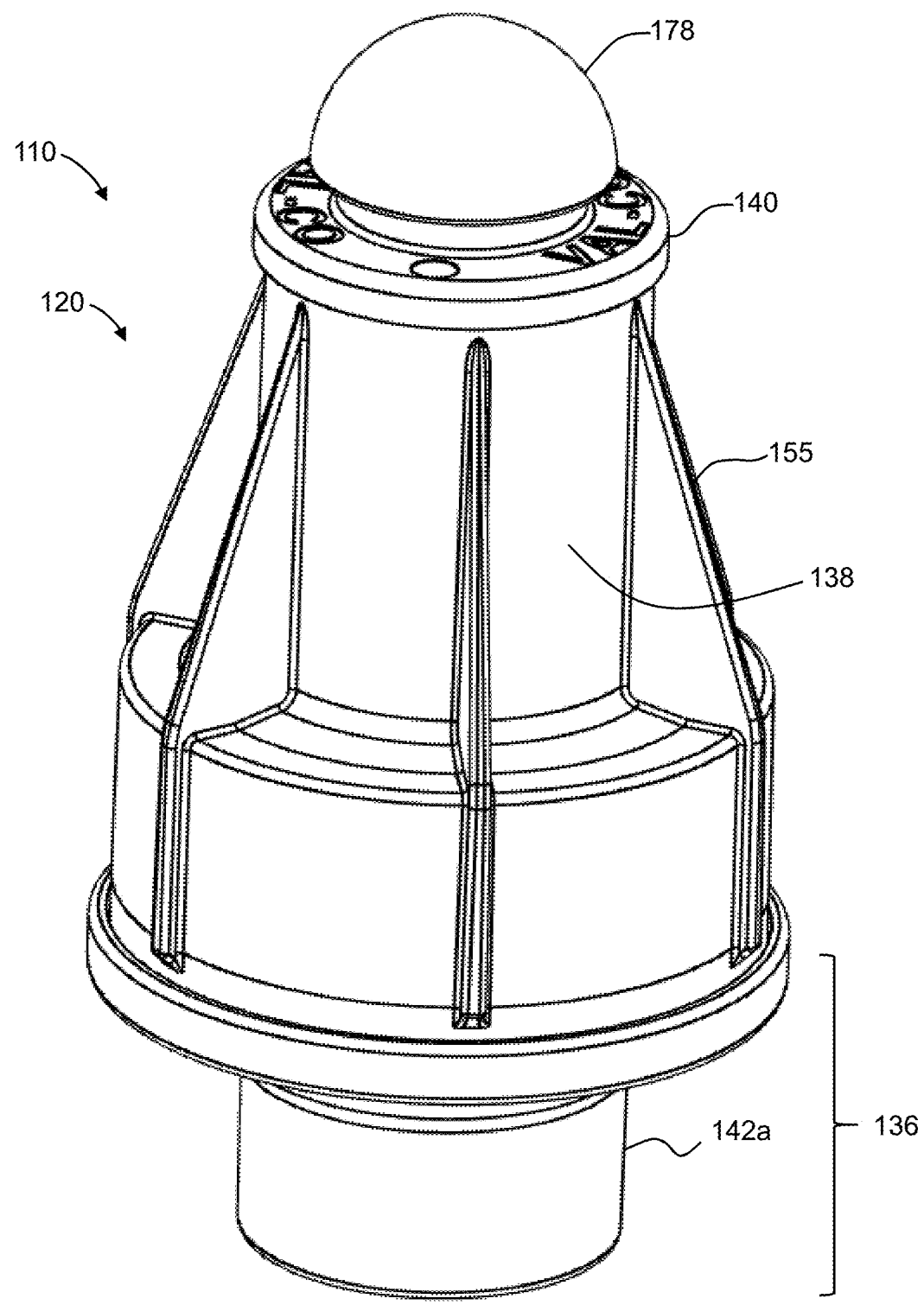
FIG. 3 shows a perspective view of a valve according to an embodiment described herein.

FIG. 2 shows one standpipe assembly 106 in more detail. The standpipe assembly 106 includes a tube 108 and a valve 110. The tube 108 is an elongated tube that, in use, is oriented substantially vertically and provides a fluid flow path from the supply line 102 to the valve 110. The tube 108 can be supported by a coil 112 surrounding the tube 108 and attached to a cable 114 that attaches the supply line 102 to a ceiling or other structure. The standpipe assembly 106 can further include a shutoff valve 116 that is configured to allow connection of the standpipe assembly 106 to the watering system 100. In some embodiments, the standpipe assembly 106 attached to a regulator 118 of the watering system 100 with a shutoff valve 116 between the standpipe assembly 106 and the regulator 118. In other embodiments, the standpipe assembly 106 can include a coupling in lieu of the shutoff valve 116 to allow the standpipe assembly 106 to be connected in line with the supply line 102.

FIGS. 3-6 show one embodiment of the valve 110. The valve 110 includes a housing 120, a first ball 122, a second ball 124, and a deflector plate 126. The housing 120 defines an inner chamber 128 and has an inlet 130 at a first end of the housing and an outlet 132 at a second end of the housing, providing fluid communication into the inner chamber 128. A longitudinal axis A of the housing 120 is defined through the length of the valve 110 and extends between the inlet 130 and the outlet 132. In use, the valve 110 attaches to the top of the tube 108 as shown in FIG. 2, so the components of the valve 110 is designed to operate in the vertical orientation shown in FIG. 4 with the inlet 130 being at the bottom end of the valve 110 and the outlet 132 being at the top end of the valve 110. In use, when the watering system 100 is in operation, any gas that is introduced into the watering system 100 would rise up through the standpipe assembly 106, enter the valve 110 through the inlet 130 and exit through the outlet 132.

The first ball 122 and the second ball 124 are disposed in the inner chamber 128 between the inlet 130 and the outlet 132 to prevent any water that may come up through the tube 108 and entering the valve 110 from spilling out through the outlet 132. In the operating orientation of the valve 110 which is the vertical orientation shown in FIGS. 2 and 4, the first ball 122 rests on a seat 134 provided by a plurality of ribs 172 extending into the inner chamber 128 from the housing 120. The second ball 124 rests on the first ball 122. The deflector plate 126 is disposed in the inner chamber 128 and is coupled to the housing 120 and is positioned between the inlet 130 and the first ball 122. The first ball 122, the second ball 124, and the deflector plate 126 are linearly aligned so that their geometric centers lie on the longitudinal axis A. The first ball 122 and the second ball 124 are movable from a first position (shown in FIG. 4), in which the first ball 122 rests on the seat 134 and the outlet 132 is open, to a second position (not shown), in which the first ball is raised above the seat 134 toward the outlet urging the second ball 124 to engage the outlet 132 and seal the outlet 132. The deflector plate 126 is configured to deflect gas that enters through the inlet 130 to prevent the gas from driving the first 122 and second 124 balls upward toward the second position, as described in further detail below.

Figure 4:
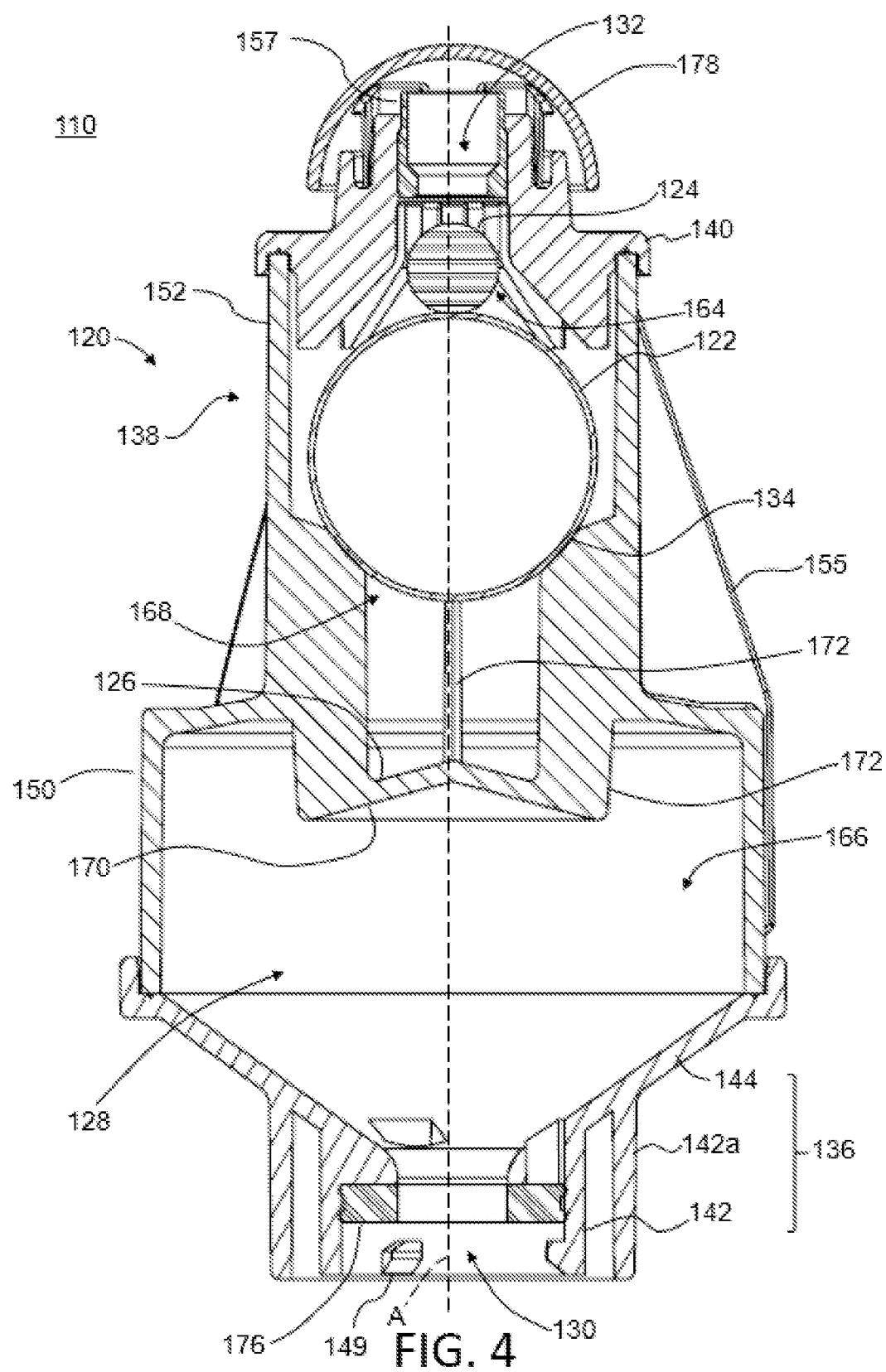
FIG. 4 shows a cross-sectional view of the valve of FIG. 3.
Figure 5:
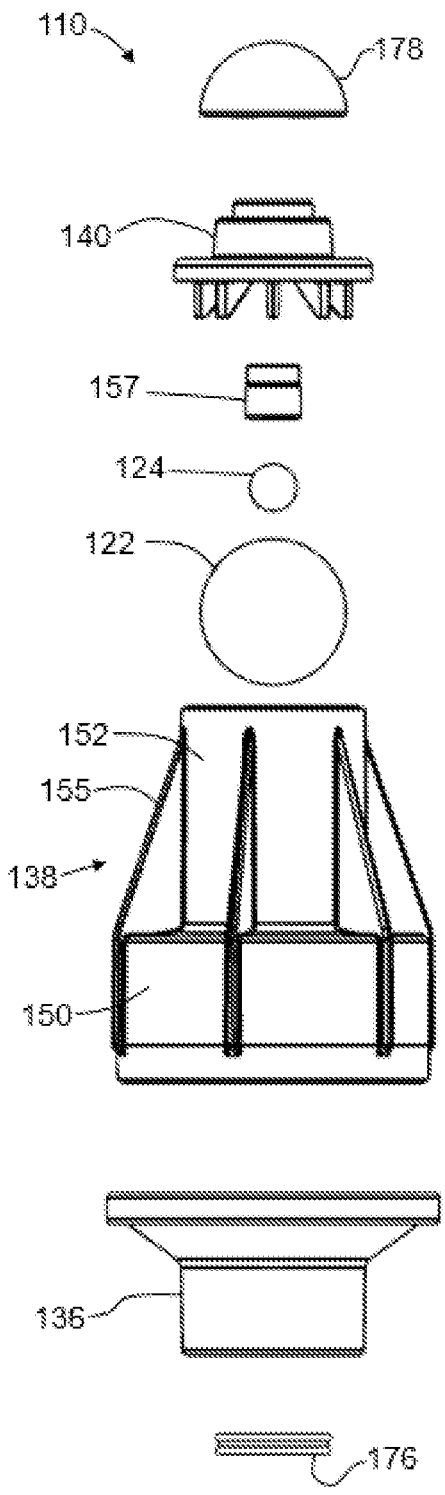
FIG. 5 shows an exploded view of the valve of FIG. 3.
Figure 6:
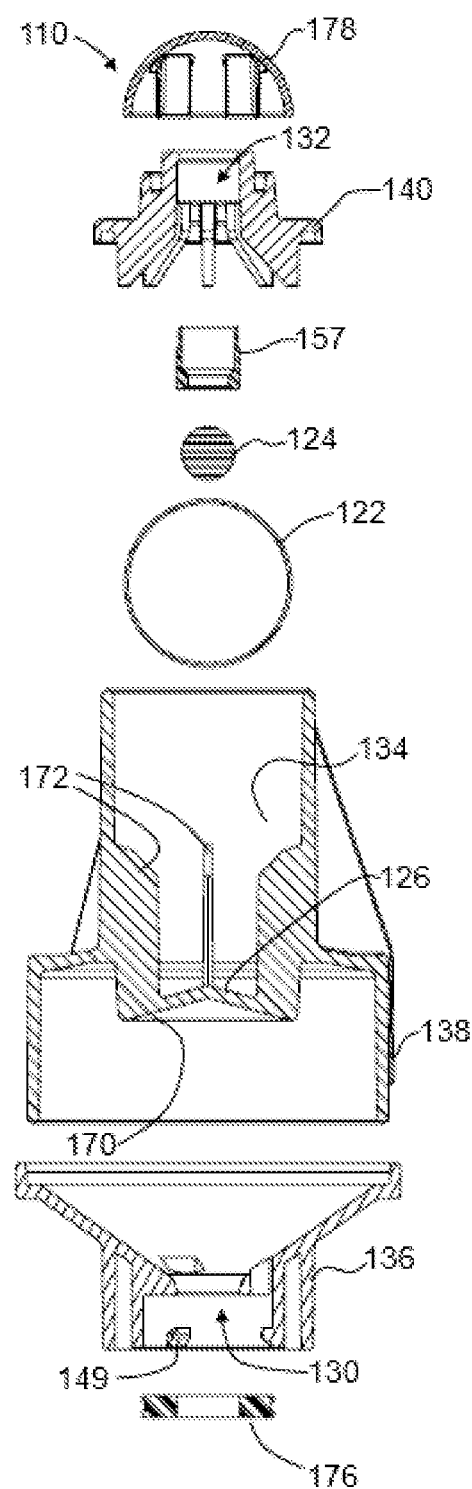
FIG. 6 shows an exploded cross-sectional view of the valve of FIG. 3.

As shown best in the cross-sectional view of FIG. 4 and the exploded views of FIGS. 5-6, the housing 120 includes a bottom member 136, a main body 138, and a cap 140. The bottom member 136, the main body 138, and the cap 140 are joined together to form the inner chamber 128.

Figure 7:
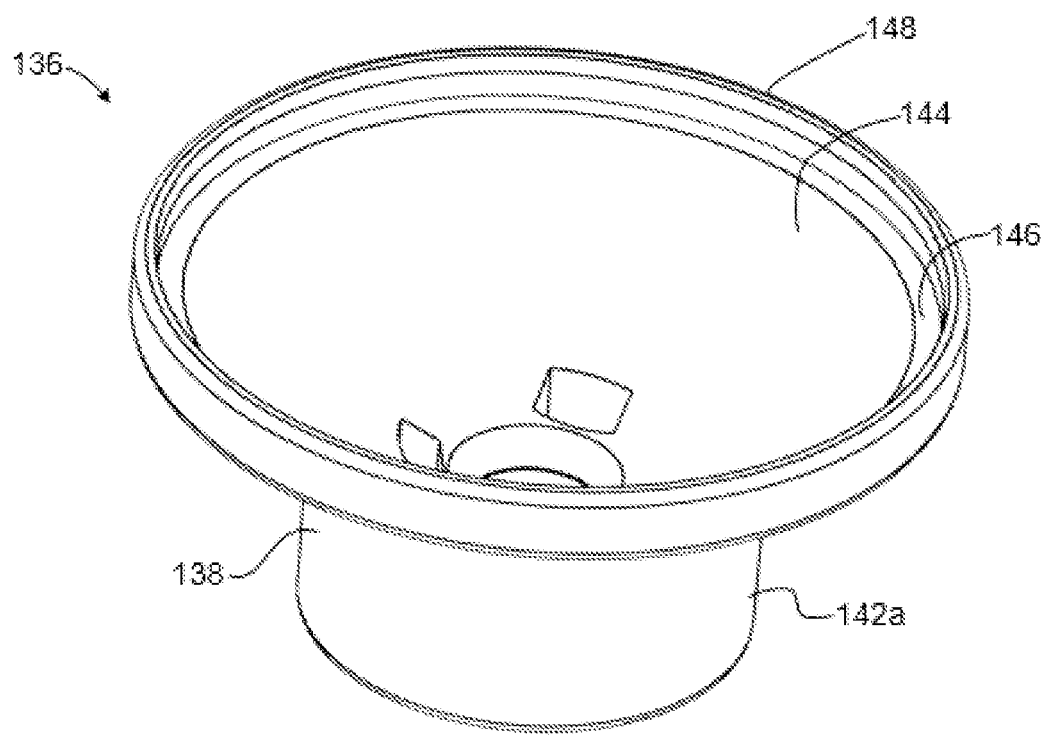
FIG. 7 shows a perspective view of a bottom member of a housing of the valve of FIG. 3.
Figure 8:
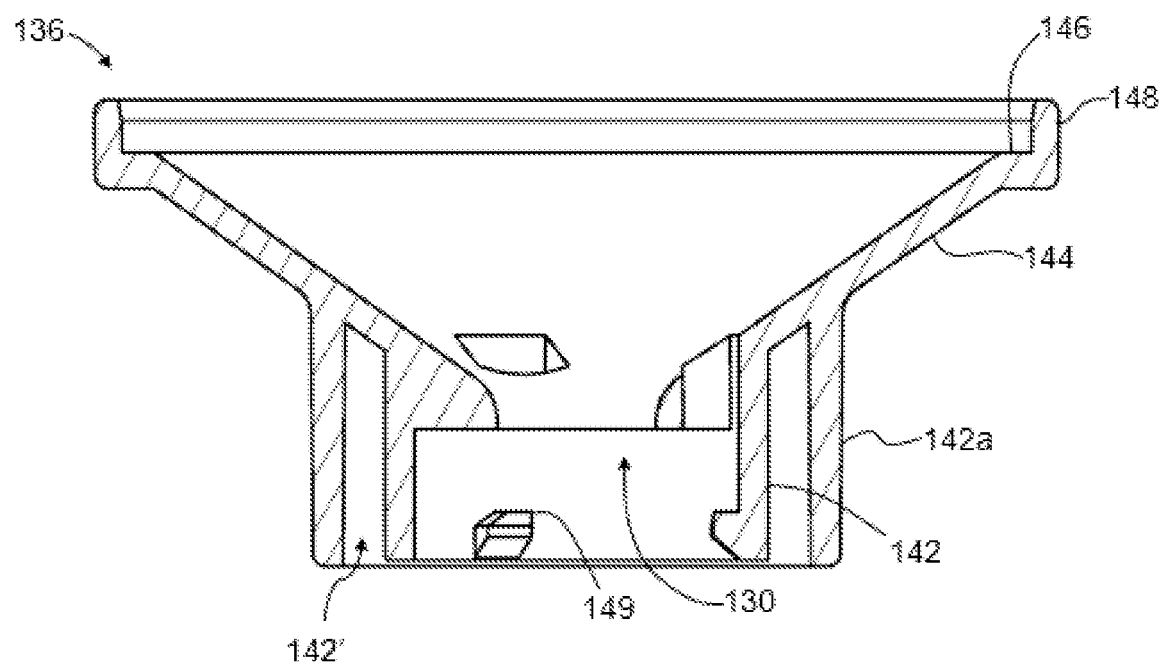
FIG. 8 shows a cross-sectional view of the bottom member of FIG. 7.
Figure 9:
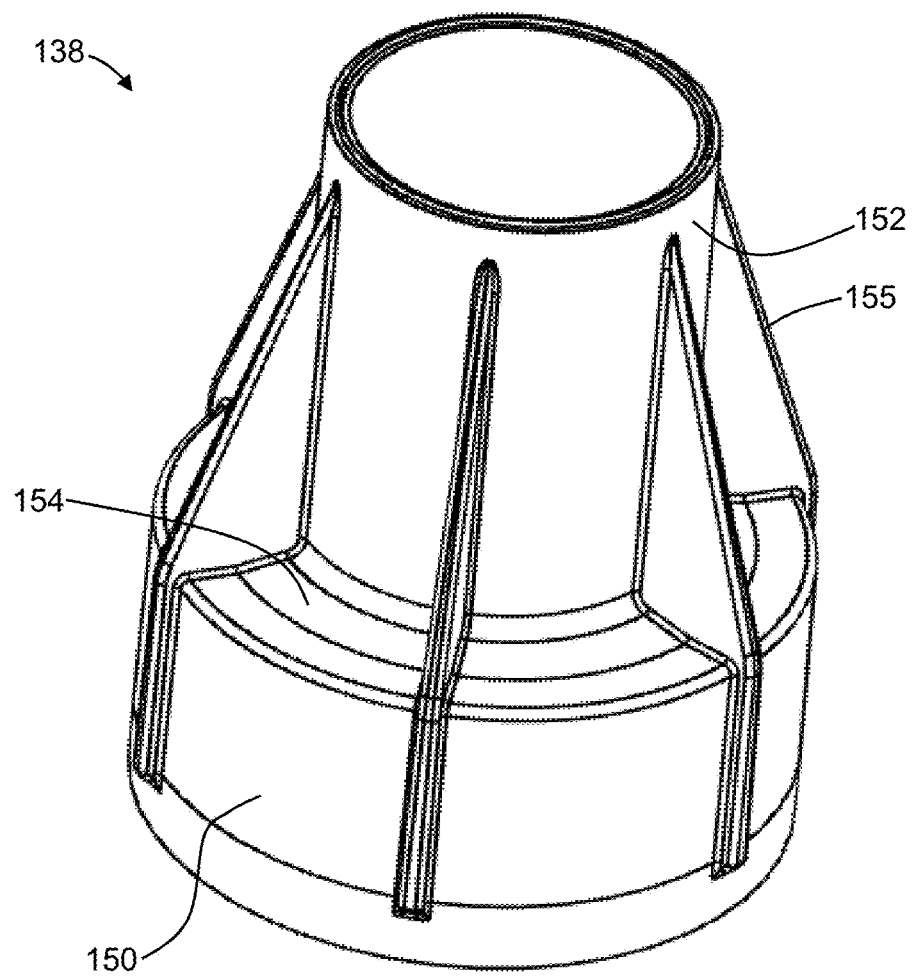
FIG. 9 shows a perspective view of a main body of the housing of the valve of FIG. 3.

As shown in FIGS. 7 and 8, the bottom member 136 defines the inlet 130. The bottom member 136 can include a cylindrical portion 142 defining the inlet 130 and a frustoconical portion 144 extending upward from the inlet 130 and toward the main body 138. The bottom member 136 includes a ledge 146 at the top of the frustoconical portion 144 and a lip 148 extending upward from the ledge 146. As described in further detail herein, the ledge 146 and the lip 148 are configured for coupling the bottom member 136 to the main body 138. In some embodiments, the main body 138 and the bottom member 136 can be integrally formed by using such methods as ultrasonic welding.

The bottom member 136 is also the structure that connects the valve 110 to the tube 108 of the standpipe assembly 106. In some embodiments, the cylindrical portion 142 slips over the end of the tube 108 to make the connection. In some embodiments, the bottom member 136 further comprises an outer cylindrical portion 142a and the end of the tube 108 can be inserted into the annular space 142' formed between the cylindrical portion 142 and the outer cylindrical portion 142*a* to make the connection.

The bottom member 136 can further include a plurality of tabs 149 extending inward from the cylindrical portion 142. Although not shown in FIG. 8, the outer cylindrical portion 142*a* also can be provided with a plurality of tabs, similar to the tabs 149, extending inward from the outer cylindrical portion 142*a*. The plurality of tabs 149 are configured for engaging the tube 108 directly or a coupling mechanism mounted to the tube 108, to couple the valve 110 to the tube 108.

The main body 138 is shown in FIGS. 9-12. The main body 138 can include a lower skirt 150 and an upper skirt 152, each of which are cylindrical. The lower skirt 150 can have a larger diameter than the upper skirt 152. A shoulder 154 connects the upper skirt 152 and the lower skirt 150. As shown in FIG. 4, the main body 138 can further include support ribs 155 extending from the lower skirt 150 to the upper skirt 152 to support the upper skirt 152. When the housing is assembled, the bottom of the lower skirt 150 is engaged with the ledge 146 and the lip 148 of the bottom member 136, as shown in FIG. 4.

Figure 13:
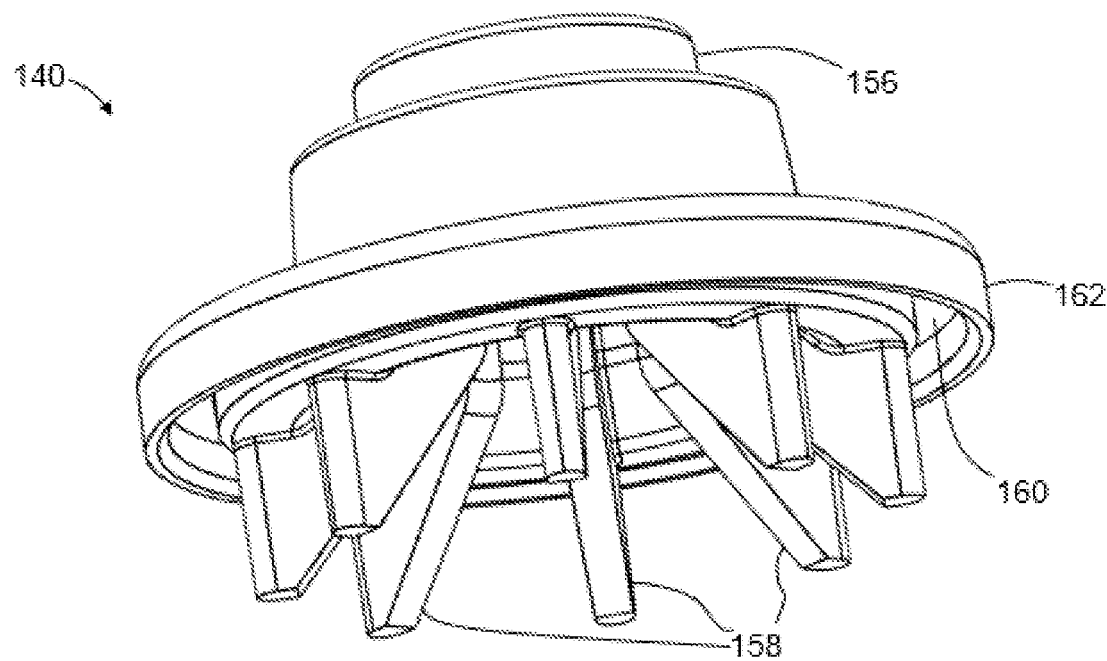
FIG. 13 shows a perspective view of a cap of the housing of the valve of FIG. 3.
Figure 14:
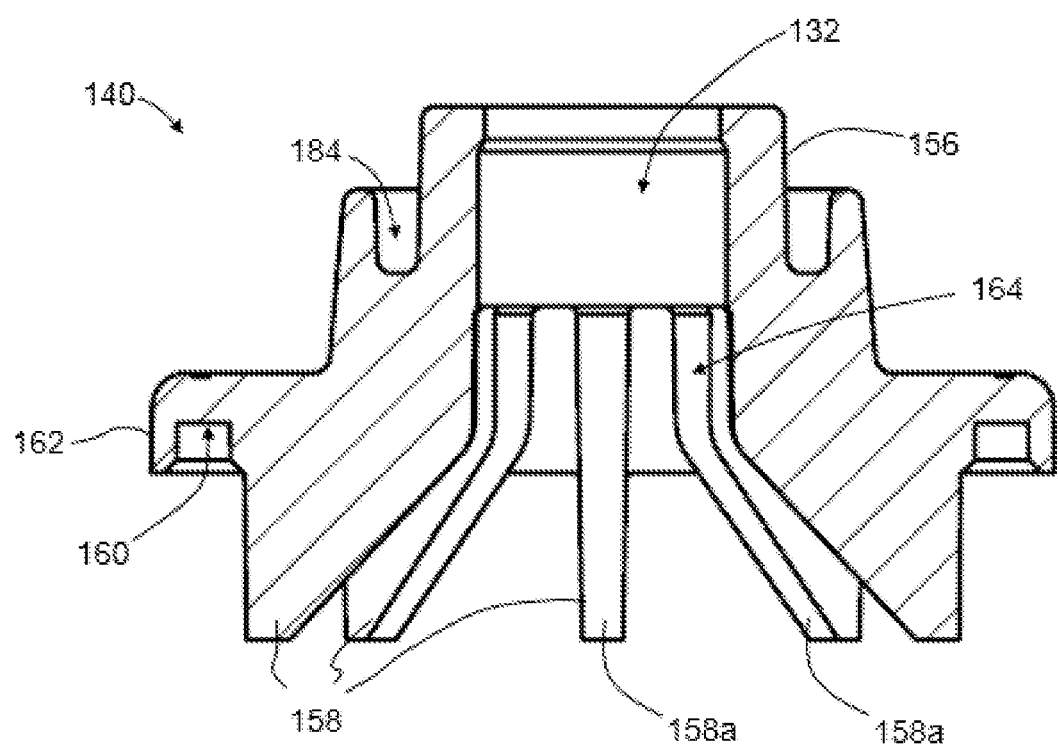
FIG. 14 shows a cross-sectional view of the cap of FIG. 13.

The cap 140 is shown in FIGS. 13 and 14. The cap 140 includes a cap skirt 156 that defines the outlet 132. In some embodiments, an outlet seal 157 is engaged with the cap 140 at the outlet 132, as shown in FIG. 4. As described in more detail below, the second ball 124 is configured to engage the outlet seal 157 when the first 122 and second 124 balls are in the second position to seal the outlet 132 and prevent the flow of water through the outlet 132. The outlet seal 157 can be constructed of an elastomeric material or any other appropriate material for providing a sealing engagement with the second ball 124.

The cap 140 can include a plurality of ribs 158 extending downward from the cap skirt 156 and radially outward, away from the longitudinal axis A. The ribs 158 collectively define a cavity 164 within which the second ball 124 is disposed. The second ball 124 is able to move upward within the cavity 164 from its first position, shown in FIG. 4, to the second position in which it engages the outlet seal 157 to prevent water from flowing through the outlet 132. The ribs 158 include angled faces 158*a* for guiding and locating the first ball 122 and/or the second ball 124.

The cap 140 can further include a circumferential flange 160 extending from the cap skirt 156 and a lip 162 extending downward from the flange 160 to engage the top of the main body 138. When the housing 120 is assembled, the cap 140 is engaged with the top of the upper skirt 152 of the main body 138, as shown in FIG. 4.

The bottom member 136, the main body 138, and the cap 140 can be joined in any suitable manner to provide a closed inner chamber 128 to prevent water that enters the inner chamber 128 from leaking out from the inner chamber 128 through the interfaces of the various components. For example, the bottom member 136, the main body 138, and the cap 140 can be joined together using adhesives or can be welded (e.g., by ultrasonic welding).

The bottom member 136 and the lower skirt 150 of the main body 138 collectively form a lower chamber 166 of the inner chamber 128. The upper skirt 152 of the main body 138 and the cap 140 collectively form an upper chamber 168 of the inner chamber 128. The first 122 and second 124 balls can be disposed in the upper chamber 168 and the deflector plate 126 can be positioned in the lower chamber 166.

Figure 10:
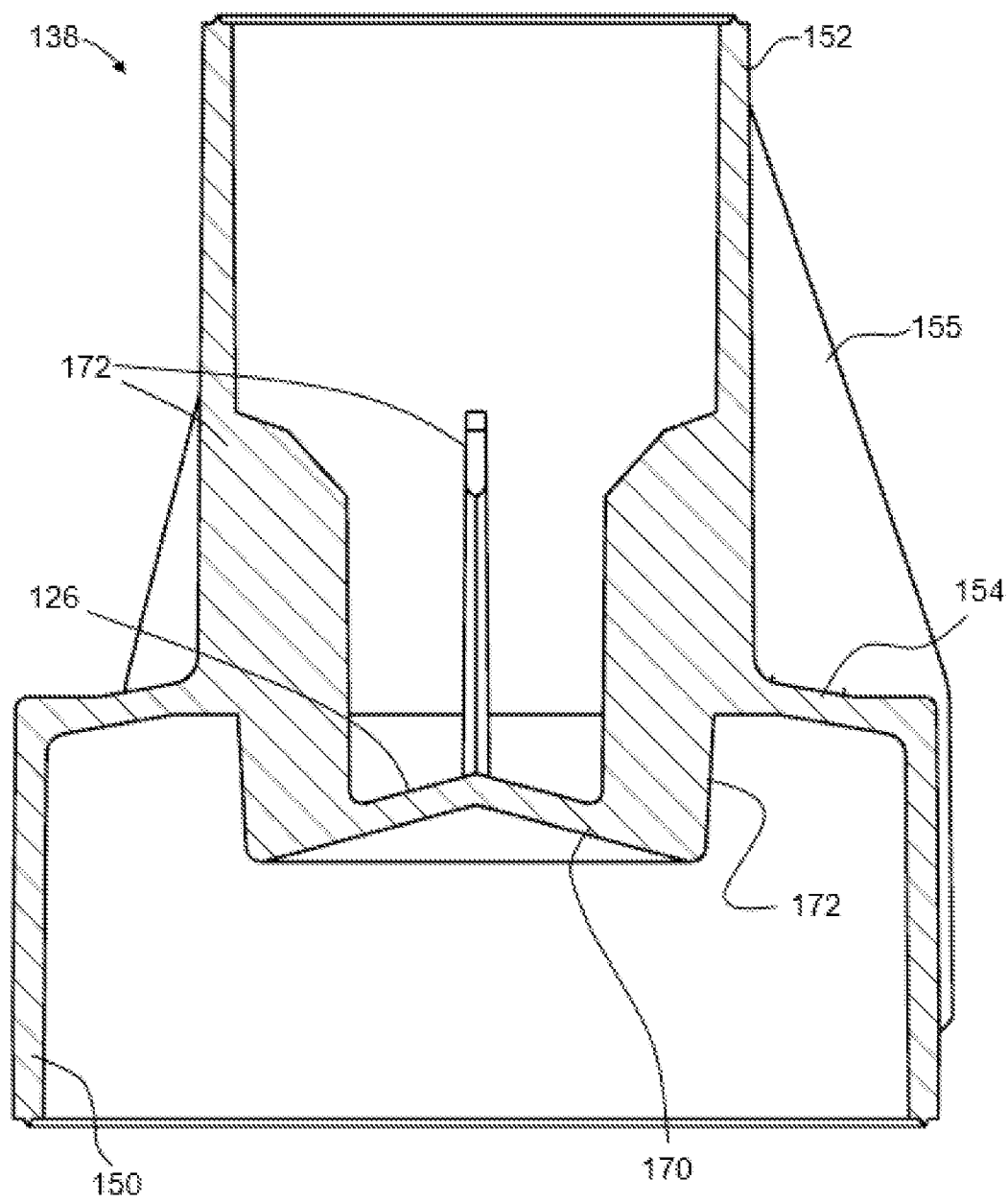
FIG. 10 shows a cross-sectional view of the main body of FIG. 9.
Figure 11:
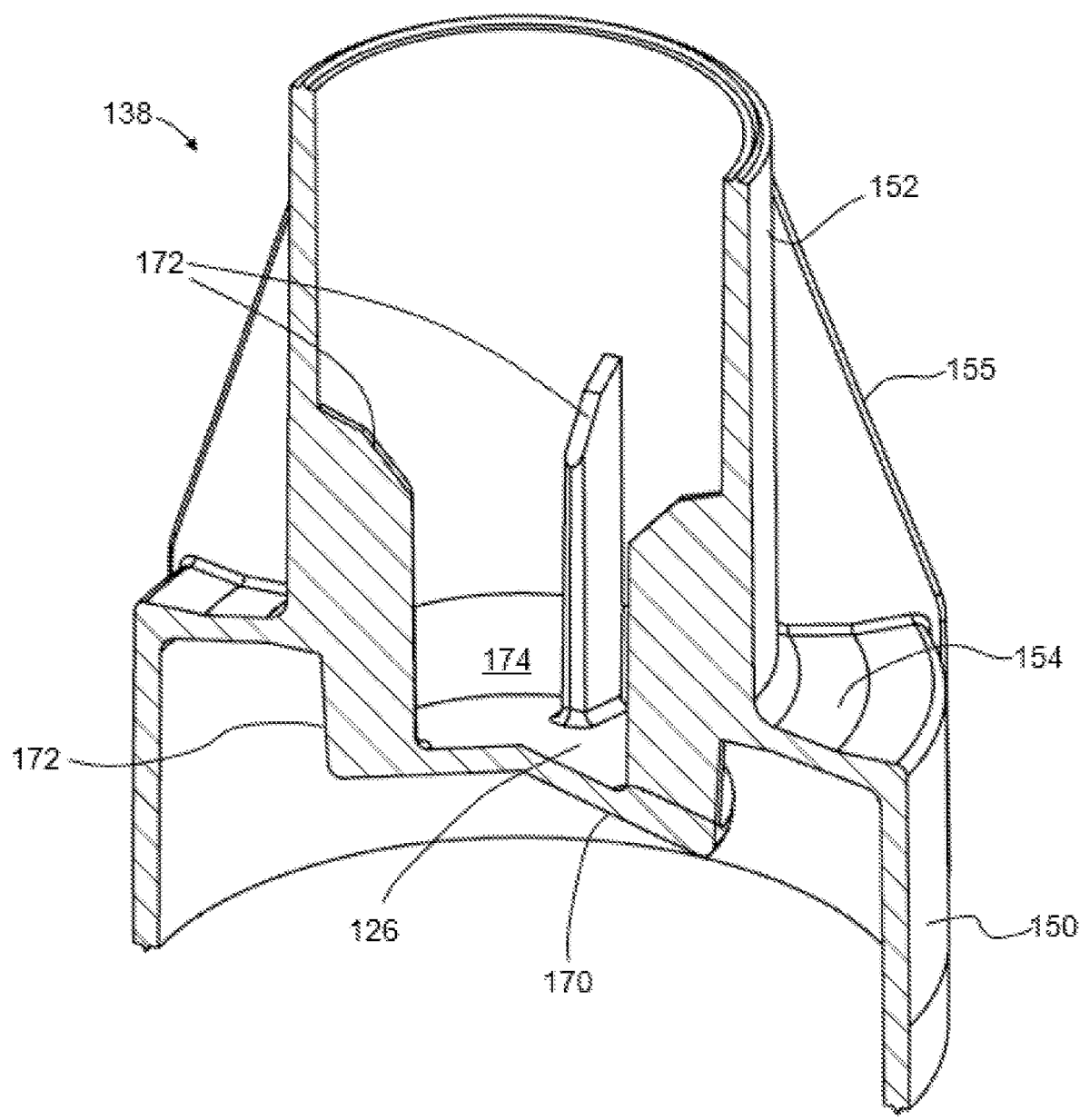
FIG. 11 shows a cross-sectional perspective view of the main body of FIG. 9.
Figure 12:
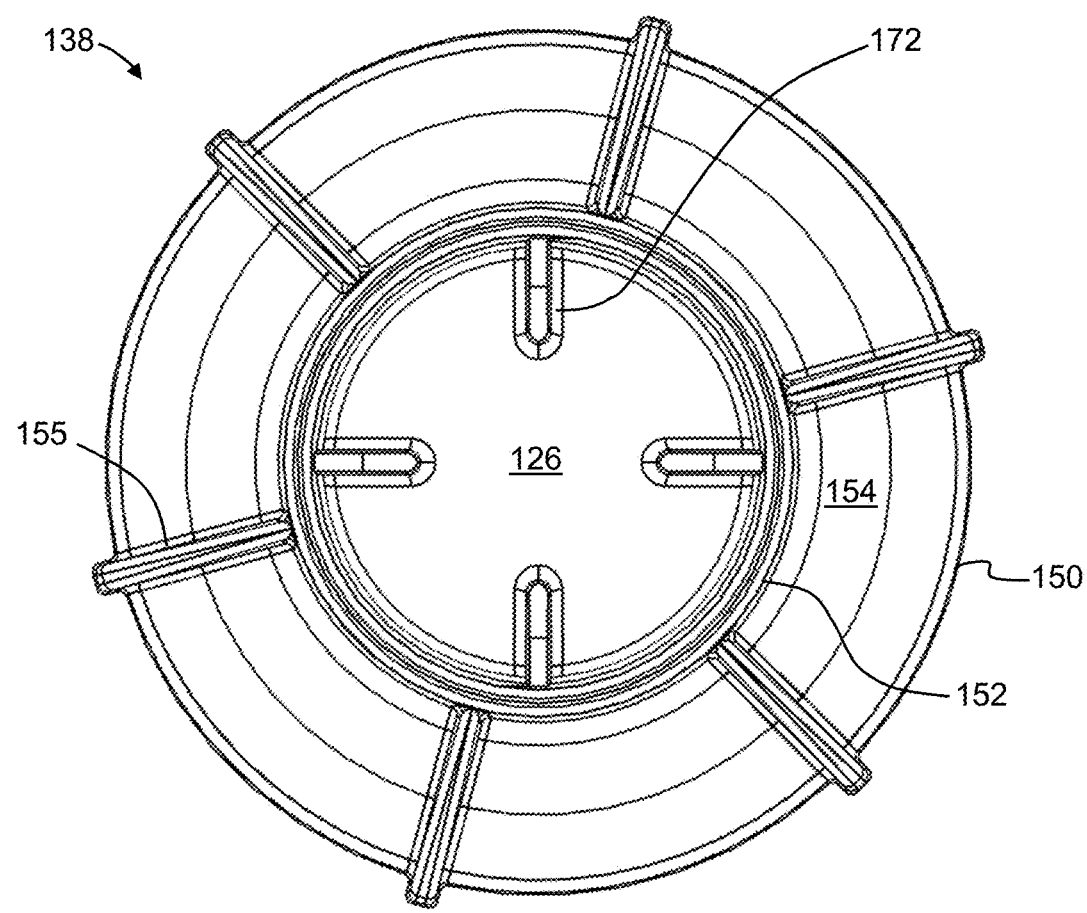
FIG. 12 shows a top end view of the main body of FIG. 9.

As shown, for example, in FIGS. 4, 10 and 11, the deflector plate 126 can have a circular shape and can have a concave, conical lower surface 170 facing the inlet 130 such that gas that enters in through the inlet 130 contacts the deflector plate 126 and is redirected downward and outward, away from the longitudinal axis A of the inner chamber 128. As shown in FIG. 4, the deflector plate 126 can be integrally formed with the main body 138 of the housing 120. For example, one or more ribs 172 can connect the deflector plate 126 to the upper skirt 152 of the main body 138. The ribs 172 can further include angled or concave faces that form the seat 134 for supporting the first ball 122. In other words, in at least some embodiments, the seat 134 is not a unitary structure, but, instead, is collectively formed by a face from each of the ribs 172. As shown best in FIG. 11, apertures 174 are formed between the ribs 172 to allow for the passage of gas and liquid from the lower chamber 166 to the upper chamber 168.

During normal operation, the first ball 122 rests on the seat 134 formed by the ribs 172. Gas that enters the inner chamber 128 through the inlet 130 (i.e., from the tube 108) flows upward, through the apertures 174 between the ribs 172, around the first ball 122 and the second ball 124 and out through the outlet 132. This allows for the exit of gas from the system 100 (i.e., venting of the system 100). The weight of the second ball 124 ensures that the first 122 and second 124 balls stay in this downward position to allow gas to exit through the outlet 132 during normal operation of the valve 110.

In the event that a high pressure and/or velocity stream of gas enters the inner chamber 128 through the inlet 130, this high pressure and/or velocity stream contacts the deflector plate 126 and is deflected downward and outward, away from the longitudinal axis A. This prevents the high pressure and/or velocity stream from forcing the first 122 and second 124 balls upward toward a position in which the second ball 124 seals the outlet 132. In prior art valves that do not have such a deflector plate, such high pressure and/or velocity streams can cause locking of the valve (i.e., the second ball 124 becomes stuck in a closed configuration engaged with the outlet 132). The deflector plate 126 of the current valve 110 prevents this locking and, thereby, increases the reliability of the valve 110 and reduces servicing requirements.

As shown in FIG. 4, the first ball 122 is formed to be buoyant and rise in response to water and/or other liquids entering the inner chamber 128. In some embodiments, the desired buoyancy can be achieved by selecting an appropriate material for the first ball 122. In some embodiments, the first ball 122 can be a solid ball made of a material having lower density than water so it has a desired buoyancy. In some embodiments, the first ball 122 can be hollow to obtain a desired buoyancy. The second ball 124 does not necessarily have to be buoyant in water because the first ball 122 is designed to be able to lift the second ball 124. The second ball 124 can also have a hollow structure or can be a solid. The second ball 124 has a smaller diameter than the first ball 122 so that it fits within the cavity 164 while the first ball 122 cannot. In some embodiments, the first ball 122 has a diameter of about 1 inch and the second ball 124 has a diameter of about 5/16 inch. The second ball 124 rests on top of the first ball 122 within the cavity 164 defined by the cap 140. During a flushing operation of the system 100 (e.g., flushing of the supply lines 102), water and/or other liquids may enter the tube 108 and rise into the inner chamber 128 of the housing 120. When the first ball 122 rises as a result of water and/or other liquids entering the inner chamber 128, the second ball 124 engages the outlet 132 to seal the outlet 132. This prevents water and/or other liquids from exiting the inner chamber 128 through the outlet 132. Hence, flushing of the system 100 can be done without causing water to run out of the valve 110.

In some embodiments, as shown in FIGS. 3-6, the valve 110 further includes an inlet seal 176 adjacent to the inlet 130. The inlet seal 176 is configured to engage the tube 108 directly or the coupling mechanism that may be provided for coupling the valve 110 to the tube 108 to prevent gas and liquid from leaking through the connection. The inlet seal 176 can be constructed of an elastomeric material or any other appropriate material. As noted above, the bottom member 136 can include tabs 149 for engaging the tube 108 or an associated coupling to couple the valve 110 to the tube 108. This may lock the inlet seal 176 in place adjacent to the inlet 130.

Figure 15:
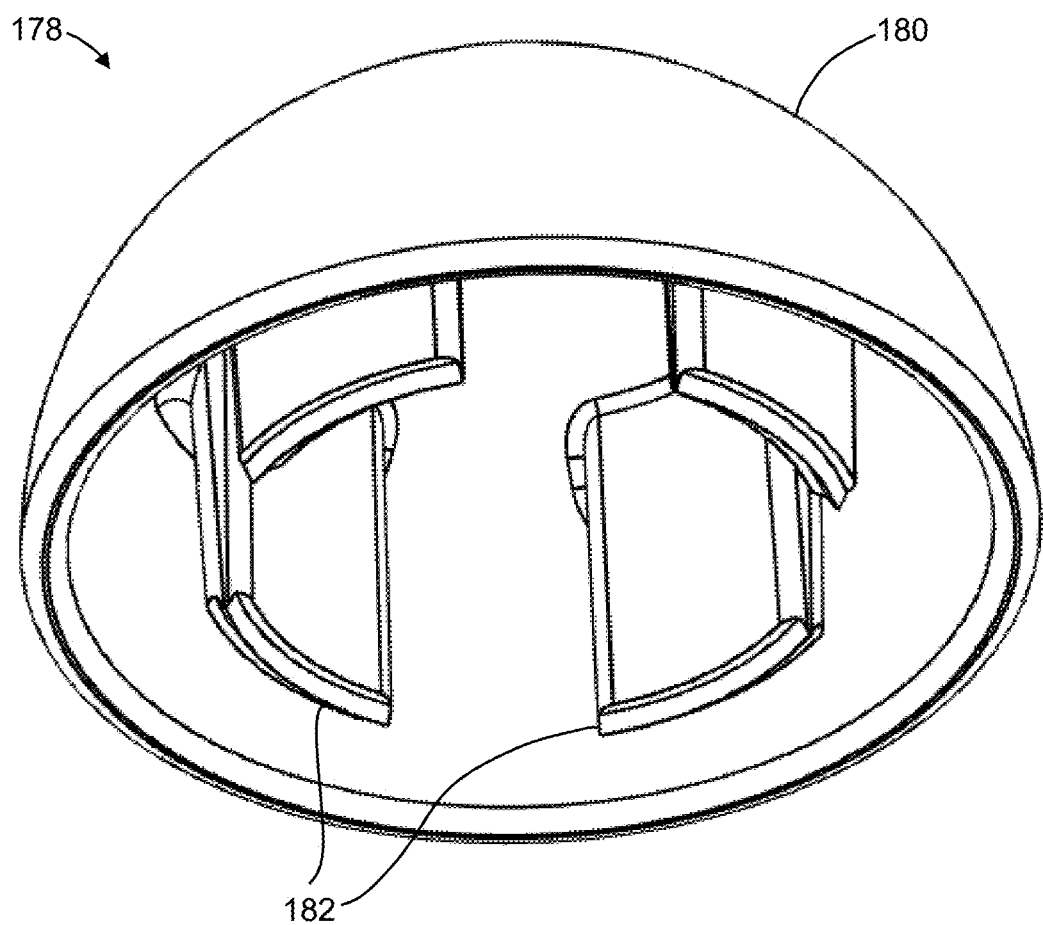
FIG. 15 shows a perspective view of a cap cover of the valve of FIG. 3.

In some embodiments, the valve 110 further includes a cap plug 178 coupled to the cap 140 and covering the outlet 132. The cap plug 178 can deflect gas that exits through the outlet 132 such that the gas is distributed and a concentrated stream of gas does not exit vertically from the valve 110. As shown in FIG. 15, the cap plug 178 includes a semi-spherical shell 180 configured to cover the outlet 132 and a plurality of extensions 182 extending downward from the shell 180 to engage a groove 184 in the cap 140 (shown in FIG. 14) to locate and retain the cap plug 178.

It will be understood that the foregoing description is of exemplary embodiments of this invention, and that the invention is not limited to the specific forms shown. Modifications may be made in the design and arrangement of the elements without departing from the scope of the invention.

What is claimed is:

1. A valve, comprising:
a housing defining an inner chamber and having an inlet at a first end of the housing and an outlet at a second end of the housing, the inlet and the outlet providing fluid communication into the inner chamber, wherein a longitudinal axis of the housing extends between the inlet and the outlet;
a first ball disposed in the inner chamber between the inlet and the outlet and, when the valve is in a vertical orientation with the inlet being at the bottom and the outlet being at the top, the first ball rests on a seat extending into the inner chamber from the housing;
a second ball disposed in the inner chamber between the first ball and the outlet and resting on the first ball when the valve is in the vertical orientation; and
a deflector plate disposed in the inner chamber positioned between the inlet and the first ball and coupled to the housing,
wherein the first ball, the second ball, and the deflector plate are linearly aligned so that their geometric centers lie on the longitudinal axis,
wherein the first ball and the second ball are movable from a first position, in which the first ball is resting on the seat and the outlet is open, to a second position, in which the first ball is raised above the seat toward the outlet urging the second ball to engage the outlet and seal the outlet,
wherein the deflector plate has a monolithic circular concave surface facing the inlet to deflect gas, that enters through the inlet, radially outward and away from the longitudinal axis extending between the inlet and the outlet to prevent the gas from driving the first and second balls upward toward the second position, and
wherein the deflector plate does not have a flowpath opening therethrough.

2. The valve of claim 1, wherein the housing comprises:
a bottom member defining the inlet;
a cap defining the outlet; and
a main body extending between the bottom member and the cap;
wherein the main body is coupled to the bottom member and the cap to form the inner chamber.

3. The valve of claim 2, further comprising a cap plug coupled to the cap and covering the outlet.

4. The valve of claim 2, wherein the inner chamber includes a lower chamber and an upper chamber, and wherein the upper chamber has a smaller diameter than the lower chamber.

5. The valve of claim 4, wherein the first ball and the second ball are disposed in the upper chamber.

6. The valve of claim 4, wherein the deflector plate is disposed in the lower chamber.

7. The valve of claim 4, wherein the main body comprises a plurality of ribs extending into the upper chamber, and wherein the ribs form the seat.

8. The valve of claim 7, wherein the deflector plate is coupled to the plurality of ribs.

9. The valve of claim 1, wherein the concave surface of the deflector plate has a conical shape.

10. The valve of claim 1, wherein the first ball is buoyant in water when water fills the inner chamber such that the first ball and the second ball rise toward the second position.

11. The valve of claim 1, wherein the valve is incorporated into an animal drinker system.

12. A standpipe assembly, comprising:
a tube; and
a valve attachable to an end of the tube, the valve comprising:
a housing defining an inner chamber and having an inlet at a first end of the housing and an outlet at a second end of the housing, the inlet and the outlet providing fluid communication into the inner chamber, wherein a longitudinal axis of the housing extends between the inlet and the outlet;
a first ball disposed in the inner chamber between the inlet and the outlet and, when the valve is in a vertical orientation with the inlet being at the bottom and the outlet at the top, the first ball rests on a seat extending into the inner chamber from the housing;
a second ball disposed in the inner chamber between the first ball and the outlet and resting on the first ball when the valve is in the vertical orientation; and
a deflector plate disposed in the inner chamber positioned between the inlet and the first ball and coupled to the housing,
wherein the first ball, the second ball, and the deflector plate are linearly aligned so that their geometric centers lie on the longitudinal axis,
wherein the first ball and the second ball are movable from a first position, in which the first ball is resting on the seat and the outlet is open, to a second position, in which the first ball is raised above the seat toward the outlet urging the second ball to engage the outlet and seal the outlet,
wherein the deflector plate has a monolithic circular concave surface facing the inlet to deflect gas, that enters through the inlet, radially outward and away from the longitudinal axis extending between the inlet and the outlet to prevent the gas from driving the first and second balls upward toward the second position, and wherein the deflector plate does not have a flowpath opening therethrough.

13. The standpipe assembly of claim 12, wherein the housing of the valve comprises:
   a bottom member defining the inlet;
   a cap defining the outlet; and
   a main body extending between the bottom member and the cap;
   wherein the main body is coupled to the bottom member and to the cap to form the inner chamber.

14. The standpipe assembly of claim 13, wherein the inner chamber of the valve includes a lower chamber and an upper chamber, and wherein the upper chamber has a smaller diameter than the lower chamber.

15. The standpipe assembly of claim 14, further comprising a plurality of ribs extending into the upper chamber, wherein the ribs form the seat, and wherein the deflector plate is connected to an end of the plurality of ribs.

16. The standpipe assembly of claim 14, wherein the deflector plate is disposed in the lower chamber.

17. The standpipe assembly of claim 12, further comprising a shutoff valve attachable to a second end of the tube.

18. The standpipe assembly of claim 17, further comprising a regulator of an animal drinker system attached to the shutoff valve.

19. The standpipe assembly of claim 12, wherein the concave surface of the deflector plate has a conical shape.

20. The standpipe assembly of claim 12, wherein the first ball is buoyant in water when water fills the inner chamber such that the first ball and the second ball rise toward the second position.

* * * * *